UNITED STATES PATENT OFFICE.

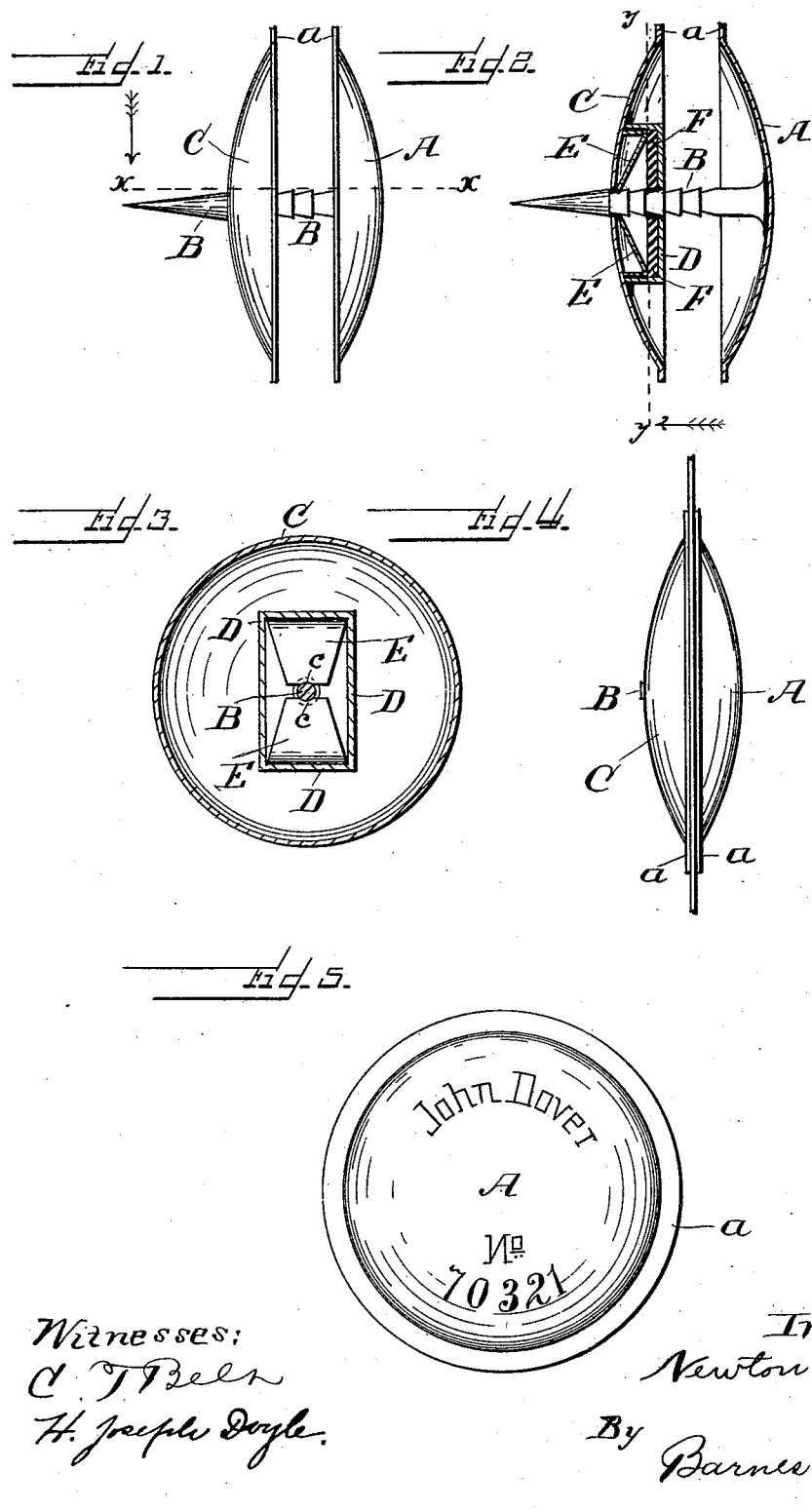

NEWTON ROZELL, OF PONCA, NEBRASKA.

STOCK-BRAND.

SPECIFICATION forming part of Letters Patent No. 495,270, dated April 11, 1893.

Application filed March 12, 1892. Serial No. 424,734. (No model.)

*To all whom it may concern:*

Be it known that I, NEWTON ROZELL, a citizen of the United States, residing at Ponca, in the county of Dixon and State of Nebraska, have invented a new and useful Stock-Brand, of which the following is a specification.

My invention is a stock brand composed of two flexible pressed metallic disks with the outer edges so pressed toward the convex sides of the same that when the two disks are placed upon the fore part of the brisket, or dewlap, or upon the ear of cattle, with the concave sides toward each other, the outer edges of the disks lie flat upon the skin—said disks being locked together upon the skin from the insides of said disks by means of a ratchet-brad, being a brad with transverse or circular grooves, which connects said disks and a self locking device which prevents the same from becoming detached.

The invention consists in a means of branding cattle, horses and sheep in such a manner as to not injure the skin.

The objects of the invention are to provide a brand that cannot be removed from the animal after the same has been placed thereon; to enable the owners of stock to have their names, number of animal and other data upon the brand; to have a brand that can be descried at a distance; to avoid the cruelty of branding with a hot iron and blistering the skin, and thereby rendering the animal less valuable.

In the drawings:—Figure 1 is an edge view of my device showing the disk separated. Fig. 2 is a sectional view thereof taken on the plane indicated by the dotted lines $x$—$x$ Fig. 1. Fig. 3 is a sectional view of the disk having the locking device secured therein, taken on the plane indicated by the dotted line $y$—$y$ Fig. 2. Fig. 4 is an edge view, showing the device adjusted and secured to an animal's ear. Fig. 5 is a front elevation of the device.

The same reference letters denote the same parts throughout the several figures of the drawings.

The disk A having the flange $a$, is concaved, and has a corrugated brad like central projection B, which has a sharp conical point for the purpose of piercing the dewlap, brisket or ear of an animal. Upon the face of this disk is stamped the cattle owner's name, number or other means of identification. The disk C is of the same size and construction of the disk A, having a central aperture to receive the projection B. Located in and soldered or otherwise secured to the concave portion of the disk C is a cap or cover D, also having a central aperture, for the locking device, which consists of two spring plates E with one end secured to the said cap or cover (or they may be directly attached to the disk) and the other free end having a notch $c$, which engages the corrugations of the projection B in whatever position the disk C may be placed by sliding it upon the said projection. Between the cap or cover D and the spring plate E is placed a cushion F of rubber or similar material having a central aperture for the purpose of keeping the free end of the spring plate hard against the projection, and at the same time to permit the said plates to spring sufficiently to receive the corrugations of the projection. It will be observed that as the disk is slid upon the projection the spring plates catch under the shoulders of the corrugations, firmly locking the disk to and preventing it from being withdrawn from the projection.

This device is used for branding as follows:—Take the disk with the sharp projection and force said projection through the brisket, dewlap or ear; then push the disk with lock attached over the corrugated projection bringing the disk against the skin on either side; then nip off the sharp end of said projection close up to the outside of disk which completes the branding.

Having thus described my invention, what I claim as new, and desire to secure by Letters Patent, is—

In a stock brand, the disk A, the corrugated projection secured thereto, the sliding disk, the cap or cover secured upon the sliding disk, the locking arms secured to the cap or cover, and the cushion located between the locking plates and the said cap or cover, substantially as and for the purpose set forth.

NEWTON ROZELL.

Witnesses:
T. R. ORR,
A. E. BARNES.